July 20, 1965

N. D. CODREA 3,195,698

PARTITION STRUCTURES

Filed April 11, 1960

NICHOLAS D. CODREA
INVENTOR.

BY *Frasen and Bogucki*

ATTORNEYS

NICHOLAS D. CODREA
INVENTOR.

ATTORNEYS

July 20, 1965  N. D. CODREA  3,195,698
PARTITION STRUCTURES
Filed April 11, 1960
7 Sheets-Sheet 7

NICHOLAS D. CODREA
INVENTOR.

BY Fraser and Bojinski

ATTORNEYS

United States Patent Office 3,195,698
Patented July 20, 1965

3,195,698
PARTITION STRUCTURES
Nicholas D. Codrea, Los Angeles, Calif., assignor, by mesne assignments, to H. B. Rothbard
Filed Apr. 11, 1960, Ser. No. 21,219
2 Claims. (Cl. 189—34)

This invention relates to inside partition structures in buildings, and more particularly to the structural elements from which such partitions are fabricated, and to the combinations of structural elements which are required to fabricate any desired type of inside partition. The invention is characterized by a novel combination of structural elements, each having multiple functions, which permit any desired type of partition to be fabricated from a small number of common parts. The invention is also characterized by novel elements which function both as structural members and as electrical conduits adapted to receive lay-in wiring with unshielded conductors. The invention is further characterized by novel means which permit quick removal of panels in a finished partition without disturbing adjacent panels or structural members, and by other novel features which speed fabrication of the partition, lower its cost, and enhance its structural properties, its utility, and its appearance.

Many partition structures and structural elements therefore have been known in the prior art, but they have all included several notable drawbacks. The prior art partitions are characterized by a multitude of complex structural elements and special fittings, and many different parts are required to fabricate the various types of inside partitions which are ordinarily encountered in practice. This multiplicity of elements has been overcome in this invention by adapting each structural element to serve multiple functions, and by providing common accessory items which fit each of the structural elements. By this method the number of basic structural elements required for the fabrication of any desired type of partition is reduced to 6; a base member, a corner member, a door jamb member, two I beam members, and a channel member.

The base member can be used as a floor baseboard, ceiling baseboard, wall baseboard, capped post, open-top rail, glazed rail, door header, cornice, horizontal panel dividing strip, or vertical panel dividing strip. The corner post serves as the corner junction of 2, 3 or 4 walls, either of thick panel, glass or partially open construction. The I beam can be used as a capped post, a horizontal panel dividing strip, a vertical panel dividing strip, an open-top rail, or a glazed rail. These members are all adapted to fit the same panels, glazing strip, and end closure. They can be fitted together in any combination by standard bolts, machine screws, and L brackets.

Another drawback in the prior art partitions relates to the removal of individual panels from the finished partitions. It is often desirable to replace individual panels when offices are redecorated, or when panels get damaged, or when new panels become available. In the prior art structures it was necessary to remove structural members, in many cases complete sections of partitions, in order to remove and replace individual panels. In accordance with this invention, however, the base structural member is provided with a removable channel wall which can be quickly detached to remove individual panels without disturbing the structural members or the adjacent panels. Furthermore, an I channel is provided with a quickly removable flange to facilitate removal of panels in locations not bounded by the base member. In addition, a quickly detachable glazing strip, which fits any of the structural members, is provided for swift removal of glass panels.

Another problem in the prior art partitions concerned the installation of electrical wiring and outlets in the partitions. In the past it has been necessary to run conduit, or shielded cable, through the hollow members of the partition, to install junction boxes for the conduits and for the outlets, and to pull wiring through the conduit from junction box to junction box. When additions or repairs were necessary in the electrical system, it was often necessary to disassemble the entire partition in order to make the necessary changes.

This expensive and complex wiring procedure is completely obviated in the partition structures of the invention by constructing the hollow structural members to meet the legal requirements of electrical conduits, so that unshielded wire can be run therethrough without the usual assortment of conduit and junction boxes. In addition, snap fitting covers are provided for the hollow structural members so that the wiring can be quickly and simply laid in the conduit, rather than being pulled through from junction box to junction box as was done in the past. The snap fitting electrical covers also double in function as covers for the screws holding the removable channel walls, described above, by which the individual panels can be quickly removed. In addition, sections of the snap fitting electrical covers can be adapted to hold plugs, switches, buzzers, or the like, which can be quickly installed at any desired point along the length of the hollow member by simply snapping them in place. With these improvements, the installation of electrical wiring is significantly simplified, and changes or repairs can be made quickly and easily after the partition has been completed.

Yet another drawback in the prior art structures was the requirement for a host of trim, moulding, or plinth members to cover up joints in the structural elements, and a variety of special fittings for joining the structural members together to form the finished partition. In accordance with this invention, however, all structural members can be joined together in any combination by standard bolts, machine screws, and L brackets, and no special trim pieces are required to cover the joints. Each structural member is adapted to present a neat, attractive appearance in any combination with the others without special trim pieces.

Accordingly, one general object of this invention is to provide inside partition structures which are low in cost, simple and sturdy in construction, easy to erect and repair, and attractive in appearance.

A second general object of this invention is to provide a novel combination of structural elements from which any desired type of inside partition can be fabricated from a small number of common parts.

A third general object of this invention is to provide improved structural elements which are adapted to serve multiple functions in inside partition structures, and which can be joined together in any combination with standard fasteners to present a neat, finished appearance without trim pieces to cover the joints.

A specific object of this invention is to provide means by which individual panels in an inside partition structure can be removed without disturbing adjacent structural members or panels.

Another specific object of this invention is to provide a novel structural element which doubles in function as an electrical conduit for unshielded conductors.

Other objects and advantages of the invention will be apparent to those skilled in the art from the following description of several illustrative embodiments thereof, in connection with the attached drawings, in which.

Figure 1:
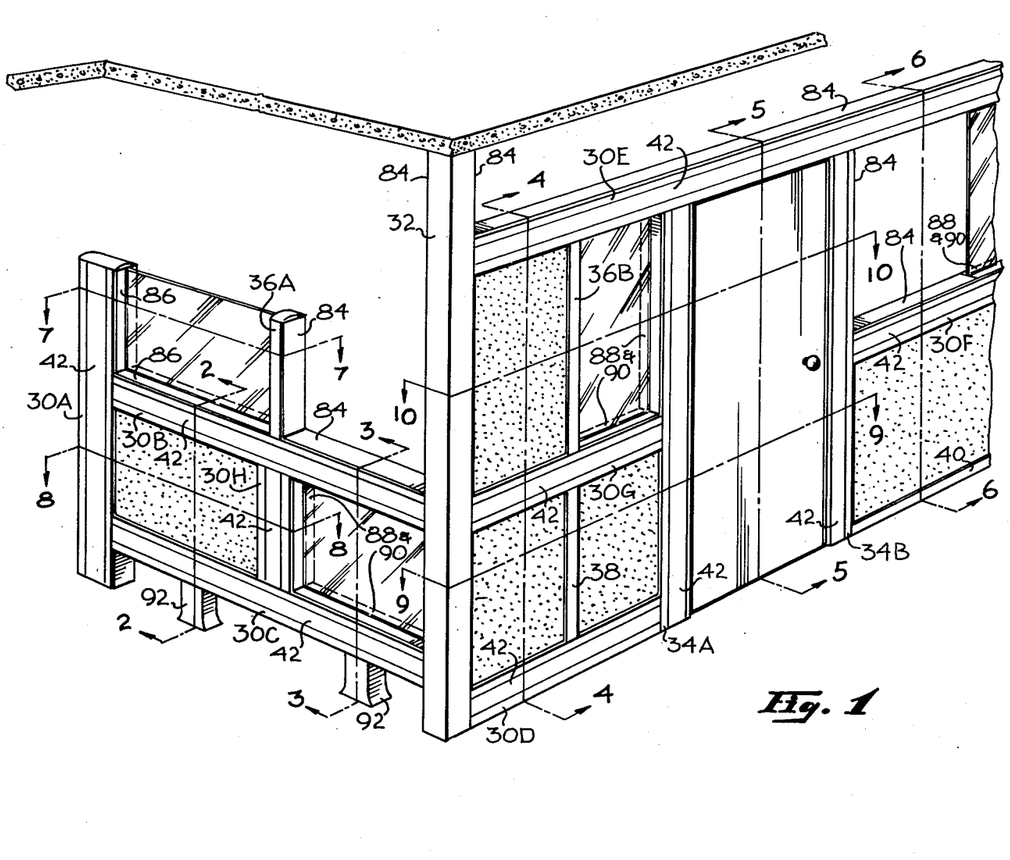
FIG. 1 is a perspective view of a partition structure incorporating some of the possible combinations which can be formed from the structural elements of this invention.

Referring to FIG. 1, one important feature of this invention is a novel combination of structural elements, each adapted for multiple functions, from which any desired type of inside partition can be fabricated. It will be understood that FIG. 1 is not intended to show any standard type of partition which is used in practice, but rather some of the combinations which are possible with the structural elements of this invention.

The basic structural elements of the invention comprise a hollow base member 30, a hollow corner post 32, a hollow door jamb 34, a solid I beam 36, a detachable flange I beam 38, and a channel 40. In FIG. 1 different sections of the same structural element are distinguished by letters appended to the part numbers; e.g. elements 30A and 30B are both sections of the base member 30, and are identical except for their position in the partition structure and their relation to the other elements thereof.

The extreme versatility of these structural elements can be seen by examining the various applications of the base member 30 in the example of FIG. 1. Section A of the base member 30 serves as a wall baseboard and capped post. Section B serves as a combined glazed-top and open-top rail. Section C serves as an open floor baseboard and section D as a closed floor baseboard. Section E is a combined door header and cornice, and section F is a combined open-top rail and horizontal panel dividing strip. Section G is a horizontal panel dividing strip, and section H a vertical panel dividing strip.

Figures 13, 18:
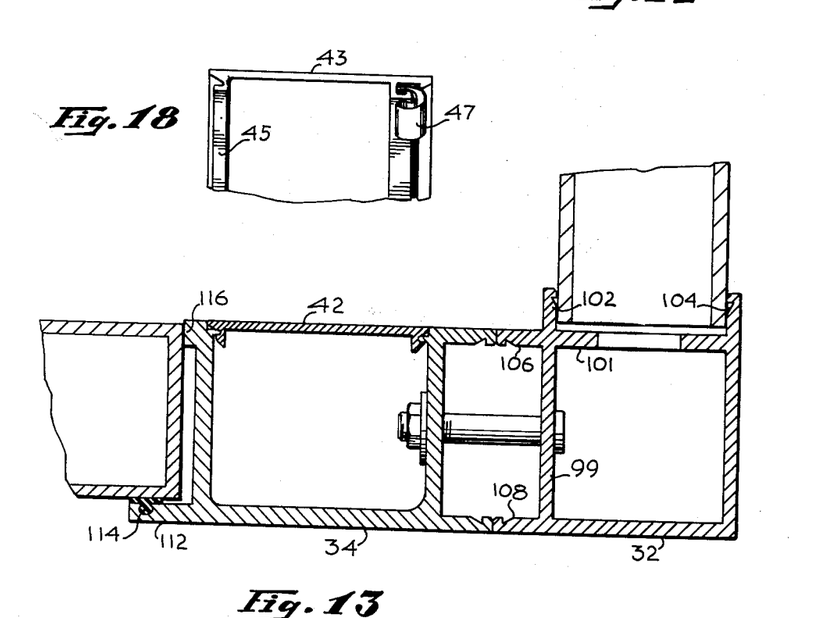
FIG. 13 is a vertical section showing a corner post forming an L joint between a panel and a door jamb.
FIG. 18 shows an alternate closure member adapted to be snap-fitted into the structural members of this invention.
Figure 21:
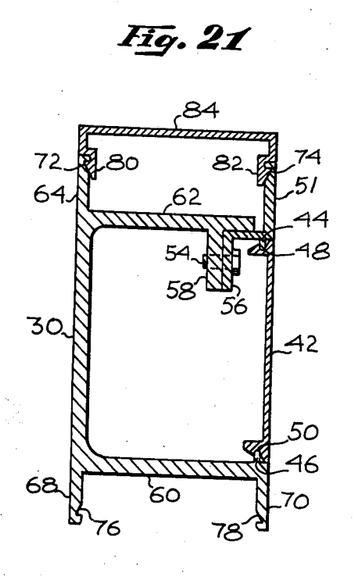
FIG. 21 shows an enlarged section of the base member.

In addition to serving as a versatile structural element, the base 30 also serves as an electrical conduit adapted to receive lay-in wiring with unshielded conductors, and as a support for electrical outlets and the like. This is accomplished by providing an electrically conductive, snap fitting closure 42 (FIG. 21) which closes a lateral opening in the side wall of the base 30. In the embodiment disclosed in the drawings, the edges of the lateral opening in the base 30 are flanked by lateral tongues 44 and 46 which engage in corresponding lateral grooves 48 and 50 in the electrical closure 42. This type of latching arrangement has been found suitable in one specific embodiment of the invention, but it should be understood that any suitable latching means can be used provided that it meets the legal requirements set forth for electrical conduits. An alternate latching arrangement for the electrical closure is shown in FIG. 18. In this arrangement a plate 43 is fitted with a grooved lip 45 which pivots against one of the tongues 44 or 46, and a curled spring 47 which snaps under the opposing tongue to hold plate 43 in place.

Figure 19:
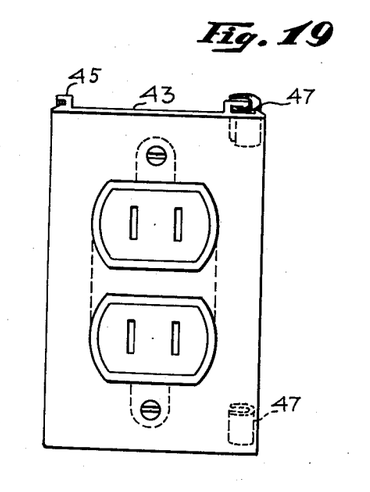
FIG. 19 shows an electrical outlet mounted in a section of the closure member shown in FIG. 18.

Sections of the electrical closure 42 or 43 can be adapted for integral mounting of electrical outlets or the like, as shown in FIG. 19. In installing these outlets in the base 30, the sections carrying the outlets are first snapped into place in the desired location along the lateral opening of the base 30, the wiring is laid in the lateral opening, and sections of the closure 42 are cut to fit the spaces between the outlets and then snapped into place to give a smooth, finished surface as shown in FIG. 1. After being snapped into place, the sections of closure 42 can be quickly removed by prying open one lateral end of the section to be removed, and pulling the section free by an outward pressure on the unsnapped end.

The base member 30 is also equipped with a detachable panel-holding strip 51 (FIG. 21) which can be quickly removed to replace individual panels in the finished partition without disturbing adjacent panels or structural members. The strip 51 is secured to the base 30 by machine screws 54, which are hidden from sight by the electrical closure 42, but which are easily accessible by removal of the electrical closure 42 as described above. It should be noted at this point that the removable electrical closure and removable panel holding strip are separate features of this invention which need not be employed together, and that their inter-relation as described above is another distinct feature of the invention. The combination of the removable panel holding strip and removable electrical closure is, however, preferable for many obvious reasons. In this particular embodiment of the invention, the strip 51 is secured to the base 30 by means of a lateral flange 56 on the strip 51 which abuts against a corresponding lateral flange 58 on the base 30. When the base member 30 and the strip 51 are made of a soft metal, such as aluminum, the screws 54 can be of the self-tapping variety, and the strip 51 can be very quickly attached to the base member 30 by clamping the two pieces together, simultaneously drilling holes through both flanges, and then driving self-tapping screws into the holes with a power wrench. There are, of course, many other ways of suitably joining the strip 51 to the base 30, but the above described arrangement has been found to be preferable in practice with one embodiment of the invention.

The hollow center of the base 30, which is defined by webs 60 and 62, is flanked on two opposing sides by channels formed by lateral lips 64, 51, 68 and 70, which project outwardly from the surface of their corresponding web. The inside surfaces of adjacent lateral lips and the outside surface of the corresponding web define a channel adapted to receive a panel, or a glazing strip, or an end closure 84. The channels are slightly wider than the panels with which the base will be used, and they are deep enough to securely hold a panel which has been slid therein without cement or additional fasteners. The outside surfaces of the channel lips are smoothly merged with the outside surfaces of the base 30 to present a finished exterior. The channel lips, with the exception of strip 51, are preferably integrally cast with the webs 60 and 62 for structural rigidity. Opposing lateral grooves 72, 74, 76 and 78 are formed near the ends of respective channel lips to receive corresponding tongues 80 and 82 in an end closure 84, which can be snapped into place to close off either channel, as best shown in FIG. 6.

Figures 2, 3, 4:
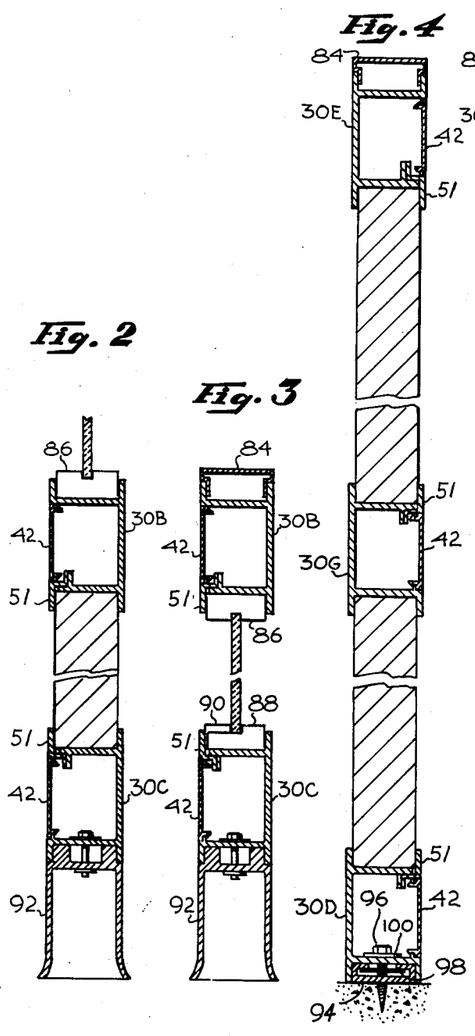
FIG. 2 is a vertical section taken on the plane 2—2 of FIG. 1.
FIG. 3 is a vertical section taken on the plane 3—3 of FIG. 1.
FIG. 4 is a vertical section taken on the plane 4—4 of FIG. 1.
Figure 5:
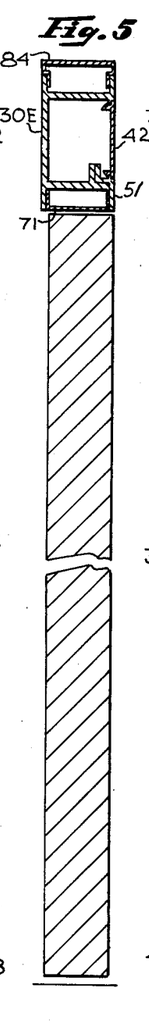
FIG. 5 is a vertical section taken on the plane 5—5 of FIG. 1.
Figure 8:
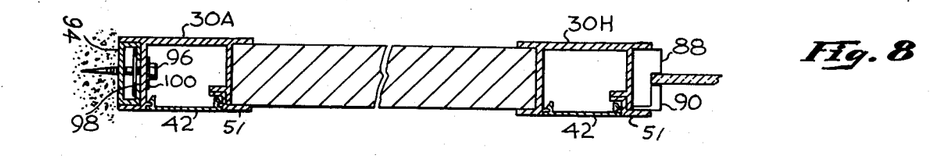
FIG. 8 is a horizontal section taken on the plane 8—8 of FIG. 1.
Figure 9:
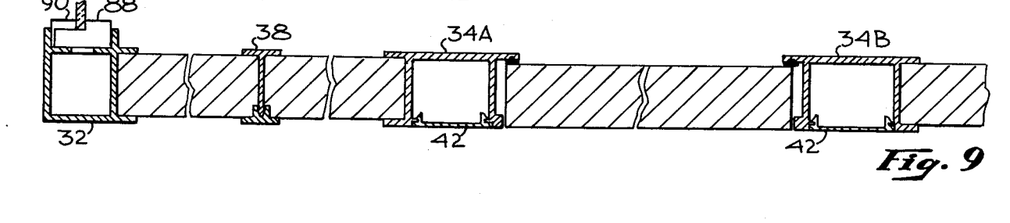
FIG. 9 is a horizontal section taken on the plane 9—9 of FIG. 1.
Figure 10:
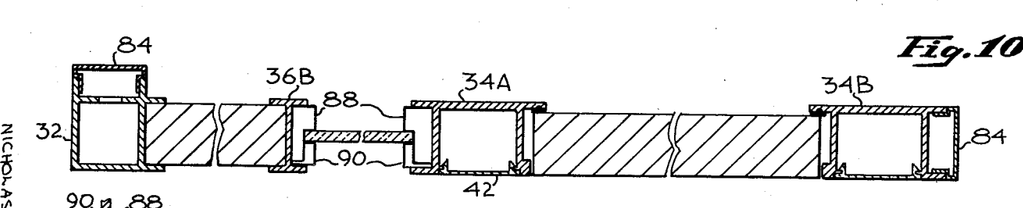
FIG. 10 is a horizontal section taken on the plane 10—10 of FIG. 1.

A fixed glazing strip 86, or a detachable glazing strip comprising members 88 and 90, can be inserted into either channel to receive a glass panel, as best shown in FIG. 3, and a foot 92 or runner 94 can be inserted into either channel to attach the base member to the floor, ceiling or wall, as shown in FIGS. 3, 4 and 8. In all of these various combinations the base 30 provides a finished appearance without trim pieces.

The runner 94 can be attached to the floor, wall or ceiling by standard screws or bolts, and the base member 30 is secured to runner 94 by a bolt 96 which engages a transverse bar 98 under the edges of the runner 94. A washer 100 is preferably provided to protect the base 30 when it is made of relatively soft material. For convenience in attaching the base 30 to the runner 94, longitudinal slots can be cut into the web 60 of the base 30 to admit the bar 98, and a bolt 96 can be attached to the bar 98 so that the bar 98 can be turned after it has been dropped through the longitudinal slot to transversely engage the edges of the runner 94. In one embodiment of the invention the bolt 96 is a carriage bolt having a square shank, and the bar 98 has a square hole cut into its center to engage the square shank of the bolt 96. Although this arrangement is effective and inexpensive, there are many other suitable methods for attaching the base 30 to the runner 94.

Figure 6:
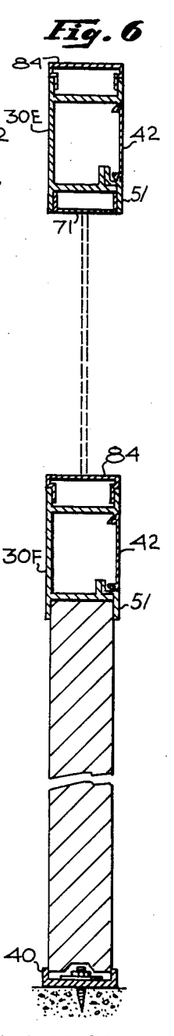
FIG. 6 is a vertical section taken on the plane 6—6 of FIG. 1.
Figure 7:
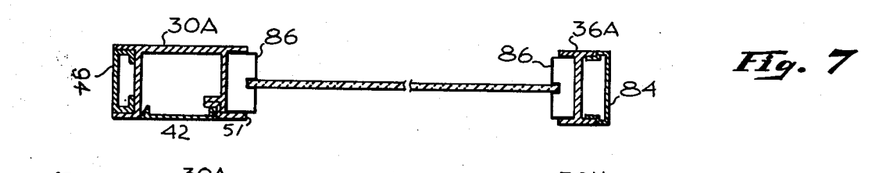
FIG. 7 is a horizontal section taken on the plane 7—7 of FIG. 1.

It is not necessary to always use the base 30 as the floor, ceiling or wall baseboard; a simple channel 40 can be used in places where a hollow baseboard is not required, as shown in FIG. 6. Channel 40 is adapted to receive panels, the fixed glazing strip 86 or the detachable glazing strips 88 and 90. It can be attached to the floor, ceiling or wall of a room by any suitable means. The channel 40 also serves as an attachment to the corner post 32, as described below.

The corner post 32 (FIGS. 13, 14 and 15) is adapted to accept two panels meeting at right angles. It contains two lateral channels disposed at right angles to each other, and the channels are adapted to accept panels, the fixed glazing strip 86, the detachable glazing strips 88 and 90 or the end closure 84. The corner post has a hollow central opening through which electrical wiring can be run. The central core is bounded by the outside surfaces of the corner post and by two webs 99 and 101. Lips 102, 104, 106 and 108 project from corresponding webs to form two perpendicular channels each adapted to receive a panel.

Figures 14, 15, 16:
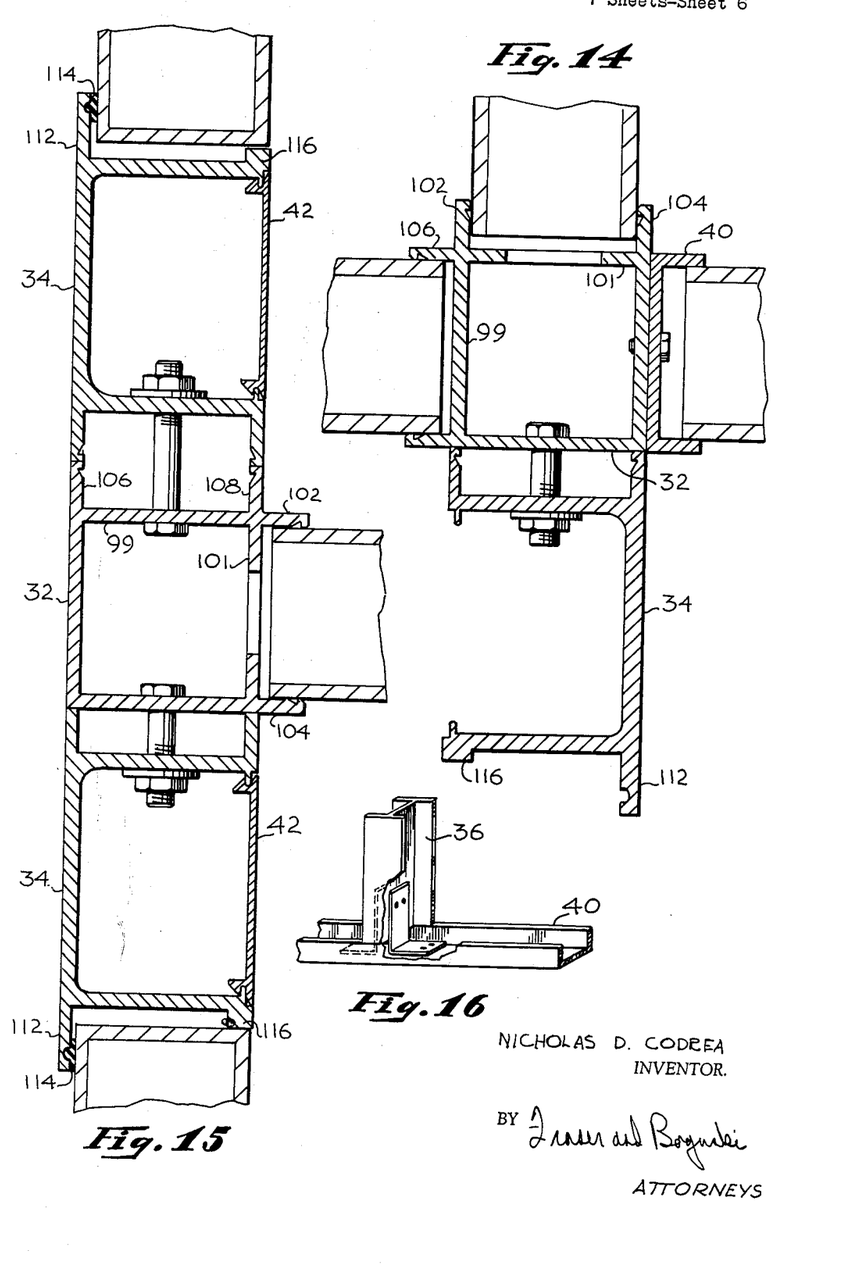
FIG. 14 is a vertical section showing a corner post and channel member forming an X joint between three panels and a door jamb.
FIG. 15 is a vertical section showing a corner post forming a T joint between two door jambs and one panel.
FIG. 16 is a perspective detail showing a butt joint between an I beam and channel member.

The corner post 32 is adapted to serve as the junction of three or four walls by simply bolting on sections of the channel 40 with sheet metal screws as shown in FIG. 14. The sections of the channel 40 are preferably bolted in place before the post 32 is attached to the other structural elements. The corner post 32 can also be attached directly to the door jamb 34, as shown in FIGS. 13, 14 and 15, if desired. Standard bolts are used for this connection, and an opening is made in one web of the corner post to provide access to the interior thereof for tightening the bolts.

The construction of corner post 32 is similar to that of the base 30 in that the lips (102, 104, 106 and 108) flanking the channels of the post smoothly blend with the outside surface of the post to present a finished exterior without any trim. And, like the base 30, the post 32 is preferably formed in a unitary structure for rigidity. In addition, the channels of the post 32 are preferably of the same dimensions as the channels of the base 30.

Figure 12:
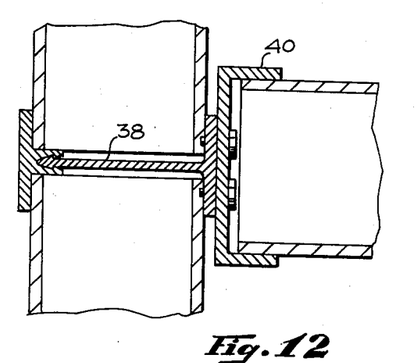
FIG. 12 is a vertical section showing a T joint formed by a channel member and snap I beam.
Figure 20:
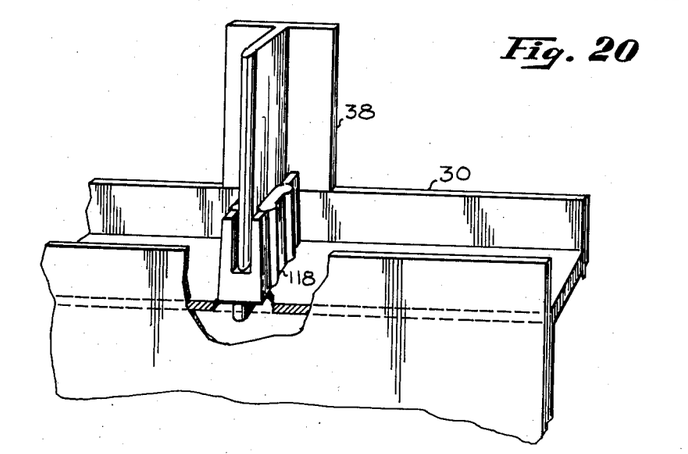
FIG. 20 shows an alternate means for joining a snap I beam to a base member.

Two I beam elements are provided in this invention, a fixed I beam 36 and a detachable flange I beam 38. Either I beam can be used as a horizontal or vertical panel dividing strip, as shown in FIG. 1, and can also be attached to a channel member 40 to form a T junction as shown in FIG. 12. The channels of both I beams are adapted to accept panels and to hold them without additional fasteners. The solid I beam 36 is also adapted to accept the fixed glazing strip 86, the detachable glazing strips 88 and 90, and the end closure 84. The I beam 36 can be used as a vertical post, as shown in FIG. 1, or as an open top rail, glazed top rail, floor baseboard, ceiling baseboard, or wall baseboard. The latter applications are not shown in the figures, but they will be easily understood by those skilled in the art without illustration. It should be noted that the solid I beam 36 can be mounted on foot 92 which serves to support base 30, because the channel construction of the two members is identical. The detachable flange I beam 38 can be removably attached to the other structural elements if desired by means of a slotted plug 118, as shown in FIG. 20. The plug 118 is press fitted into a slot cut in the other structural element, and the T member of detachable flange I beam 38 is inserted into the slot in the plug 118, which is adapted to hold the T member firmly in place but to permit quick removal thereof without tools.

The door jamb 34 is similar to the base 30 except in being adapted at one side to accept a door. It has a channel on one side adapted to accept panels, but the opposing side is fitted with a door stop 112 which is grooved to receive a resilient bumper 114. A lateral abutment 116 forms a recess in which door hinges can be mounted, and a lateral opening in one side wall provides entry for lay-in wiring. The edges of the lateral openings are fitted with lateral tongues to engage the electrical closure 42.

Door jamb 34 can be used as the sides or header of any door, but in cornice height doors it is preferable to use the cornice as a header, as shown in FIG. 1. The door jamb can be bordered by solid panels, glass or open space; all illustrated in FIG. 1. The sides of the door jamb can be attached to the header by a butt joint, or by a diagonal joint as required. Since the dimensions of the base 30 are the same as those of the jamb 34 these two members can also be joined by diagonal joints.

Figure 17:
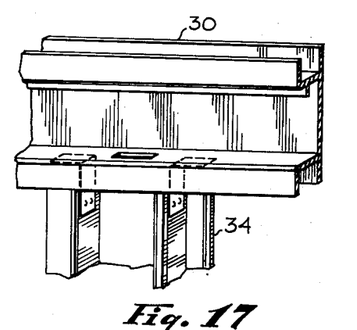
FIG. 17 is a perspective detail showing a butt joint between a door jamb and base member.

The basic elements of this invention, the base 30, corner post 32, door jamb 34, solid I beam 36, detachable flange I beam 38 and channel 40 are preferably made in standard lengths of extruded aluminum or the like. The standard lengths are chosen with an eye to convenience in shipping, and to convenience of assembly in standard size panels. When the lengths are properly chosen the elements will fit into place with a minimum of cutting at the site. The basic elements can be butt joined together in any desired combination by standard machine screws and L brackets, as shown in FIGS. 16 and 17.

Figure 11:
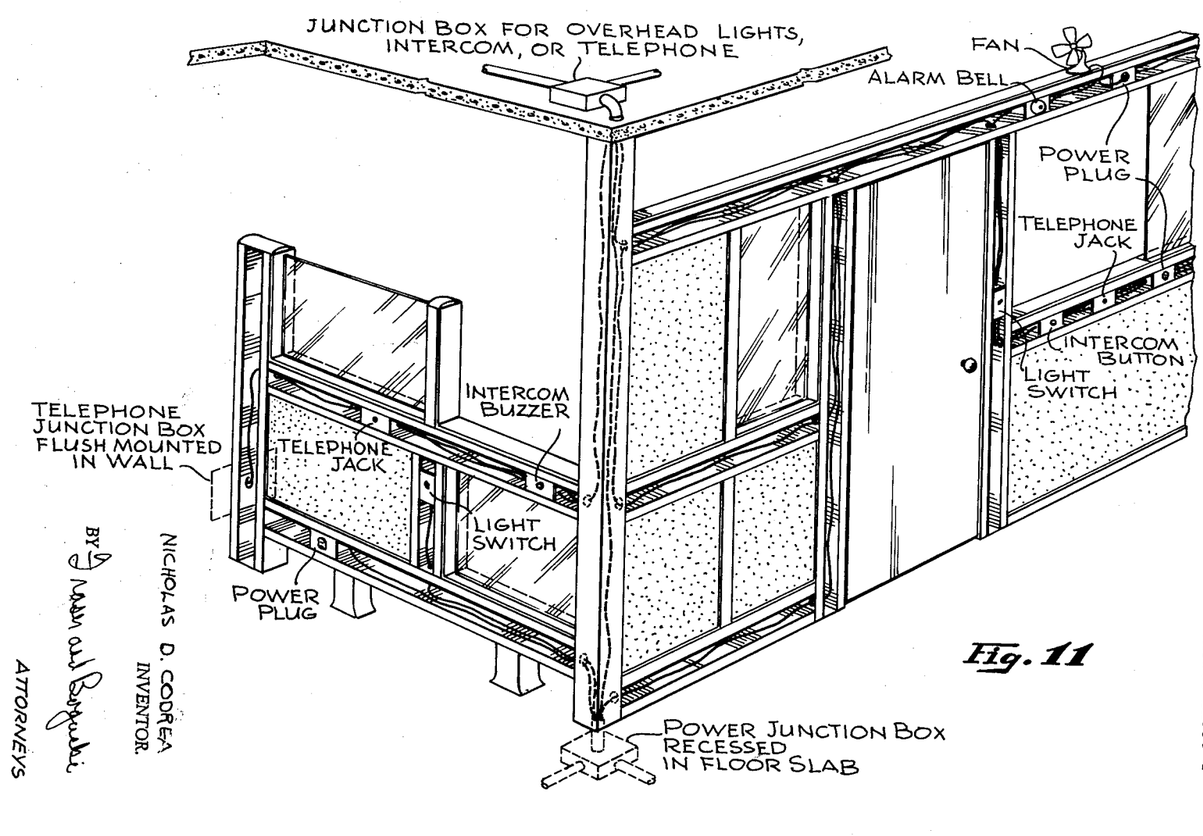
FIG. 11 is a perspective view of the partition structure of FIG. 1 showing some of the possible combinations of electrical outlets and wiring which can be incorporated therein.

Before assembling the individual elements together, some thought must be given to the electrical wiring which will be used in the finished partition. As shown in FIG. 11, a variety of power, intercommunication, telephone and other wiring can be run anywhere in the partitions through the hollow members. This wiring can originate at junction boxes located in the wall, ceiling or floor of the room, and can be introduced into the partition structure at any point along any of the hollow members. If the existing junction boxes in the building are not located near one of the hollow members, new junction boxes can be installed in the proper locations before the partition is erected.

Some thought must also be given to the removability of panels in planning the partition. In this specific embodiment of the invention the corner post, door jamb, solid I beam and channel member are not fitted with panel detaching means. Therefore, thick panels which fit against these members must be bounded on the other three sides by base members or detachable flange I beams to be removable. This, however, is not necessary in the case of glass panels, because the detachable glazing strips 88 and 90 adapt all of the structural members for quick removal of glass panels.

From the foregoing description it will be apparent that this invention provides novel partition structures which are low in cost, simple and sturdy in construction, easy to erect and to repair, and attractive in appearance. It will also be apparent that this invention provides a novel combination of structural elements from which any desired type of partition can be fabricated with a small number of common parts, and furthermore that this invention provides improved structural elements which are adapted to serve multiple functions in inside partition structures.

It should be understood that this invention is by no means limited to the specific structures disclosed herein, since many modifications can be made in the structures shown without departing from the basic teaching of this invention. For example, the door jamb 34 could be fitted with a removable strip, if desired, similar to the strip 51 of the base 30. Many materials other than aluminum could be used to make the basic structural elements, and many methods other than extrusion could be employed. The electrical closure 42 and the end closure 84 need not be latched over their respective openings by the tongue and groove members shown; they could be hinged to one side of the opening and latched by a spring fitting to the other side. These and many other modifications will be apparent to those skilled in the art, and this invention includes all modifications falling within the scope of the following claims.

What is claimed is:

1. A base structural element for use in inside partition structures containing panels, said element comprising: a relatively long, hollow body member having an open lateral channel formed in each of two opposing sides thereof, each of said channels being adapted to receive and to hold a panel; a lateral opening formed in a third side of the body member, said lateral opening being in communication with the hollow interior of the body member, and the body member being adapted to receive electrical conductors laid within the hollow interior thereof through said lateral opening therein; a lateral closure member separate from said sides defining said channels adapted to cover said lateral opening and define electrical outlets; means on the body member and lateral closure member for removably securing the lateral closure member to the body member over the lateral opening of the body member; the body member and lateral closure member being adapted to function as an electrical conduit; and a detachable lip forming one side of one of said channels formed in the body member, said detachable lip bounding one side of said lateral opening and containing means for receiving and securing said lateral closure member, and said detachable lip being removably secured to the body member within the hollow interior thereof.

2. A base structural element for use in inside partition structures containing panels, said element comprising a relatively long, hollow body member containing a flat, solid side member having two lateral web members projecting at right angles from one surface thereof, said lateral web members being parallel to each other and being spaced inwardly from the edges of the side member such that a portion of said side member extends outwardly from each web member to form a pair of laterally extending lips at right angles to the corresponding lateral web member; one lateral web member being longer than the other in cross-section and being terminated in a lateral lip parallel to the lateral lip at the other end of the web member, and said one lateral web member and its adjacent lateral lip members forming an open lateral channel adapted to receive and to hold a panel; the shorter lateral web member being terminated in a flange projecting at right angles from the unjoined end thereof toward the other lateral web member; a detachable strip member having a lateral flange projecting at right angles from one edge thereof in a first direction and having a lateral lip projecting at right angles from the other edge thereof in a second direction, the width of said strip being equal to the difference in length between said first and second web members, said strip adapted to be attached to said shorter web with the flange of the strip in contact with the flange of the web member, and the shorter web member and the strip member and their associated lips forming an open channel adapted to receive and hold a panel when the strip is attached to the web member; a lateral tongue projecting from said one web member toward the other web member at the end thereof opposing said side member, a lateral tongue projecting from said strip in the direction of said lateral flange thereof; and a lateral closure member adapted to cover the space separating said one web and said strip when said strip is attached to the shorter web, and two lateral grooves formed in opposing edges of closure member, said grooves being adapted to engage the tongues of said one web member and said strip member to removably secure the closure member over said space separating the strip member from said one web member.

References Cited by the Examiner

UNITED STATES PATENTS

| | | | |
|---|---|---|---|
| 845,350 | 2/07 | Gillespie | 189—39 |
| 2,203,119 | 6/40 | Wollaeger | 189—85 |
| 2,718,291 | 9/55 | Goldberg | 189—46 |
| 2,755,895 | 7/56 | Walterman et al. | 189—46 |
| 2,790,524 | 4/57 | Herrschaft | 189—39 |
| 2,808,136 | 10/57 | Hammitt et al. | 189—85 |
| 2,867,300 | 1/59 | Bohnsack | 189—34 |
| 2,915,151 | 12/59 | Kekenak | 189—34 |
| 3,066,770 | 12/62 | Millard et al. | 189—34 |
| 3,096,861 | 7/63 | Frick et al. | 189—34 |

FOREIGN PATENTS 281,053  6/52  Switzerland.

RICHARD W. COOKE, Jr. *Primary Examiner.*
CORNELIUS D. ANGEL, *Examiner.*